(12) United States Patent
Griffin

(10) Patent No.: US 6,237,005 B1
(45) Date of Patent: May 22, 2001

(54) WEB SERVER MECHANISM FOR PROCESSING MULTIPLE TRANSACTIONS IN AN INTERPRETED LANGUAGE EXECUTION ENVIRONMENT

(75) Inventor: David Michael Griffin, Maynard, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/106,300

(22) Filed: Jun. 29, 1998

(51) Int. Cl.[7] .................................................. G06F 17/00
(52) U.S. Cl. ................................................ 707/102; 717/5
(58) Field of Search .................................. 707/100–104; 717/5, 9

(56) References Cited

U.S. PATENT DOCUMENTS

| | | | |
|---|---|---|---|
| 5,500,881 | * | 3/1996 | Levin et al. ............................... 717/3 |
| 5,715,453 | | 2/1998 | Stewart . |
| 5,881,219 | * | 3/1999 | Leung et al. ............................ 714/31 |

OTHER PUBLICATIONS

Dah Ming Chiu, David M. Griffin, "Building Collaboration Software for the Internet," Digital Technical Journal, vol. 8, No. 3, 1996, pp. 66–74.

* cited by examiner

Primary Examiner—Hosain T. Alam
Assistant Examiner—Jean Bolte Fleurantin
(74) Attorney, Agent, or Firm—Leah Sherry; Oppenheimer Wolff & Donnelly LLP

(57) ABSTRACT

A web server computer system includes a dispatcher program that processes transaction request messages received from a web browser. The dispatcher program includes a combination of persistent and transient interpreters that are used to process the transaction. The persistent interpreters are maintained in memory for an indefinite period of time and across multiple transactions. One type of persistent interpreter is a master interpreter that is used to coordinate the processing activity. A second type of persistent interpreter is a pristine interpreter that provides relevant context for any application programs required to process the transaction. A transient interpreter is maintained in memory for a finite duration, such as across a single transaction. One type of transient interpreter is a transaction interpreter that is used to process the transaction request message. The transaction interpreter is formed and used by the master interpreter to execute the procedures stored by the pristine interpreters that are required to execute the transaction to completion. When the transaction is complete a transaction result is returned to the web server and the transaction interpreter is preferably deleted from memory. The combination of persistent and transient interpreters in an interpreted language execution environment reduces the setup time across multiple transactions and thereby improves upon transaction processing performance.

28 Claims, 12 Drawing Sheets

| SERVER ADDRESS | ACCESS CONTROL | PROGRAM | DATABASE INSTANTIATION | TRANSACTION NAME | TRANSACTION ARGUMENTS |
|---|---|---|---|---|---|
| 410 | 420 | 430 | 440 | 450 | 460 |
| http://www-server.myfirm.com/ | power_user_grp/ | dispatch.cgi/ | _M_STRAT_docshare/ | addNewDoc/ | 10014/ ... |

WEB SERVER MECHANISM FOR PROCESSING MULTIPLE TRANSACTIONS IN AN INTERPRETED LANGUAGE EXECUTION ENVIRONMENT

FIELD OF THE INVENTION

This invention relates generally to network servers, such as web servers on the Internet. More specifically, this invention relates to a mechanism for transactions in an interpreted language execution environment.

BACKGROUND OF THE INVENTION

The widespread proliferation of computers over the past decade has prompted the development of computer networks that allow computers to communicate with each other. With the introduction of the personal computer (PC), computing became accessible to large numbers of people. Networks for personal computers were developed that allow individual users to communicate with each other.

One significant computer network that has recently become popular is the Internet. The Internet grew out of this proliferation of computers and networks, and has evolved into a sophisticated worldwide network of computer systems. The Internet has been applied to enable a user, seeking information on this worldwide network, to switch from server to server and database to database; this application of the Internet is sometimes referred to as the worldwide web (WWW).

A user at an individual PC (i.e., workstation) that wishes to access the Internet typically does so using a software application known as a web browser that is loaded onto the workstation. A web browser makes a connection via the Internet to other computers known as web servers, and receives information from the web servers that is displayed on the user's workstation.

The Internet also enables geographically distant users to collaborate on an item of interest. For example, a project team may need to keep track of project status and individual progress, people with a common interest (e.g., film enthusiasts) may want to share and discuss their views on that topic, a customer support group may need a system to provide on-line answers to real-world customer problems, or several authors may wish to work on a document together. Today, several computer applications facilitate such collaboration.

In an Internet-based collaboration environment, the web browser submits requests to the web server whenever the user desires to obtain information from the web server. If the request involves transferring a file, for example, then the web server sends the file to the web browser. If the request requires running application programs on the web server that involve transaction processing, for example, then the web server invokes the application program necessary to complete the transaction and the application program responds by processing the transaction request. Transaction processing is a type of computer processing in which the computer responds immediately to user requests; each request is considered to be a transaction. The opposite of transaction processing is batch processing, in which a number of requests are stored and then executed all at one time. Transaction processing requires interaction with a user, whereas batch processing can take place without user involvement during processing.

When the application program invoked involves transaction processing, the web server invokes a dispatcher program, which is an application program that accepts the transaction, processes it, and returns a result to the user. In particular, the dispatcher analyzes the transaction request, loads the appropriate application program(s), executes the code of the application program(s), and ultimately generates a response that is transmitted back to the web browser for presentation. The dispatcher program is based, for example, on an interpreted programming language, that requires the availability of an interpreter for its execution.

An interpreter refers to a space in memory containing an interpreted language execution environment. An interpreted language execution environment contains the appropriate context that allows the interpreted language execution environment to process transactions. The context of the interpreted language execution environment, for example, includes variables, procedures of instructions, libraries, etc. Much of the execution performed when processing transactions entails executing high level commands that manipulate data contained in the transaction request message as well as utilities (e.g. databases) and application program procedures necessary to complete the transaction.

In known systems, for every transaction request received involving the execution of an application program, the dispatcher program performs the following: The dispatcher goes through an initialization and configuration procedure to establish an interpreted language execution environment (such as that formed to support commercially available interpreted programming languages, for example, the Tool Command Language—TCL) that will process the transaction. The dispatcher then forms a toolkit environment that includes a number of utilities and language extensions (e.g. databases) within which the application program will operate. The toolkit environment subsequently forms part of, and otherwise supports, the interpreted language execution environment. The dispatcher copies the required application program in its entirety to the interpreter. The dispatcher then executes the application program that is required to process the particular transaction request received by interpreting the instructions contained within that application program. Lastly, the dispatcher returns the result of the transaction to the web server for ultimate transmittal to the web browser.

Once the transaction is complete, the web server deletes the interpreted language execution environment formed to handle that transaction (including all of the parameters and procedures stored in memory relating to the particular transaction). The process that launched the dispatcher program is also terminated. This procedure is repeated for each transaction request received, requiring a "build-up and tear down" of the dispatcher for each instance of a transaction. The build-up or setup time, during which the interpreted language execution environment is established and the application program is loaded, can correspond to a relatively substantial part of the overall processing time for a transaction, particularly for transactions involving small applications.

Although the method implemented as just described was suitable for its intended purpose, the steady growth in the size and complexity of applications significantly increases the setup time for processing transactions, thereby degrading web server performance. In addition, as the number of Internet users continues to rapidly expand, it will become necessary for a web server to more efficiently process the correspondingly larger number of transaction requests received. A system and method for optimizing transaction processing by reducing the setup time across multiple transactions and, as a result, focusing computer resources on processing the transactions themselves is desirable.

SUMMARY OF THE INVENTION

The invention resides in a method implemented by a computer system (e.g. Web Server) for processing transactions that uses a combination of persistent (retained indefinitely in memory) and transient (retained temporarily in memory) interpreters to process a transaction request. The invention consequently avoids the lengthy "build-up and tear-down" procedure described above.

A method in accordance with the invention forms a persistent interpreter, for example a master interpreter, which configures an interpreted language execution environment. The master interpreter also maintains a set of global parameters, global procedures, and application-specific code/parameters that are useful in processing a number of transactions. The master interpreter and its contents are stored in memory for a number of transactions. Further, the invention requires the formation of a transient interpreter, for example a transaction interpreter, which accesses the contents of the master interpreter, executes the transaction, and returns a result to a computer system. The transaction interpreter is formed to process a single transaction and is therefore stored in memory until the particular transaction is completed and a result is returned. Once the transaction is complete, the transaction interpreter and its contents (including parameters and procedures modified during execution of the specific transaction) are preferably deleted from memory. By leveraging off of the initializations, configurations, and copies performed for prior transactions and maintained in persistent interpreters, the invention can reduce the overall setup time required for subsequent transactions and thereby can result in significant performance improvements during transaction processing.

More specifically, in an illustrative embodiment of the invention, when a message containing a transaction request involving an application program is received, the Web Server invokes a dispatcher program to process the transaction. The dispatcher then forms a persistent "master" interpreter, if one does not already exist. The master interpreter configures and indefinitely stores an interpreted language execution environment in the Web Server's memory. The master interpreter then accepts a transaction request from the Web Server and determines the application programs that are required to process the transaction. The master interpreter subsequently forms a number of persistent "pristine" interpreters (if they do not already exist) to store application specific parameters, such as application variables and application procedures. The master interpreter also forms a transient transaction interpreter, and then invokes the transaction interpreter to process the transaction. When the processing of the transaction requires parameters that are not already stored in the transaction interpreter, the master interpreter locates the required parameters in the master interpreter, itself, (for global parameters), or in the pristine interpreters (for application-specific parameters), or in another data source coupled to the master interpreter. The master interpreter then passes the required parameters to the transaction interpreter for further processing. Upon completing execution of the requested transaction, the transaction interpreter returns the result(s) of the transaction, if any, to the dispatcher. The master interpreter then deletes the transaction interpreter, with all of the parameters required for that specific transaction. Lastly, the master interpreter forms a new transaction interpreter in preparation for the next transaction request.

By maintaining master and pristine interpreters in memory for multiple transactions, the invention minimizes the time-consuming setup of the interpreted language execution environment and application program execution environments during subsequent transactions. As the setup time is decreased, the invention enables the computer to more effectively process transactions by focusing computer resources on "executing" the desired transaction. This enables the computer to process more transactions during a given time period. Consequently, the computer is able to service a larger number of users who are submitting these transactions during a high-usage, time period.

In addition, by passing only the necessary portions of an application program that are required to process a given transaction to the transaction interpreter, the invention potentially avoids the time consuming setup associated with passing large and complex application procedures during subsequent transactions. Consequently, as the trend towards larger and more complex applications continues, the invention will be able to accommodate any future features and capabilities without sacrificing the transaction processing performance of the computer.

Further, by isolating the execution of the transaction to a particular transaction interpreter and then deleting that transaction interpreter when execution is complete, the invention ensures that processing of that particular transaction does not affect future transactions. Discarding the transaction specific execution environment containing parameters modified during execution of a specific transaction, also frees up memory resources that may then be applied to other system tasks.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

FIG. 4 is a block diagram of an illustrative example of a transaction request message;

DETAILED DESCRIPTION OF THE PREFERRED EMBODIMENT

Multinode Transaction Processing System

Figure 1:
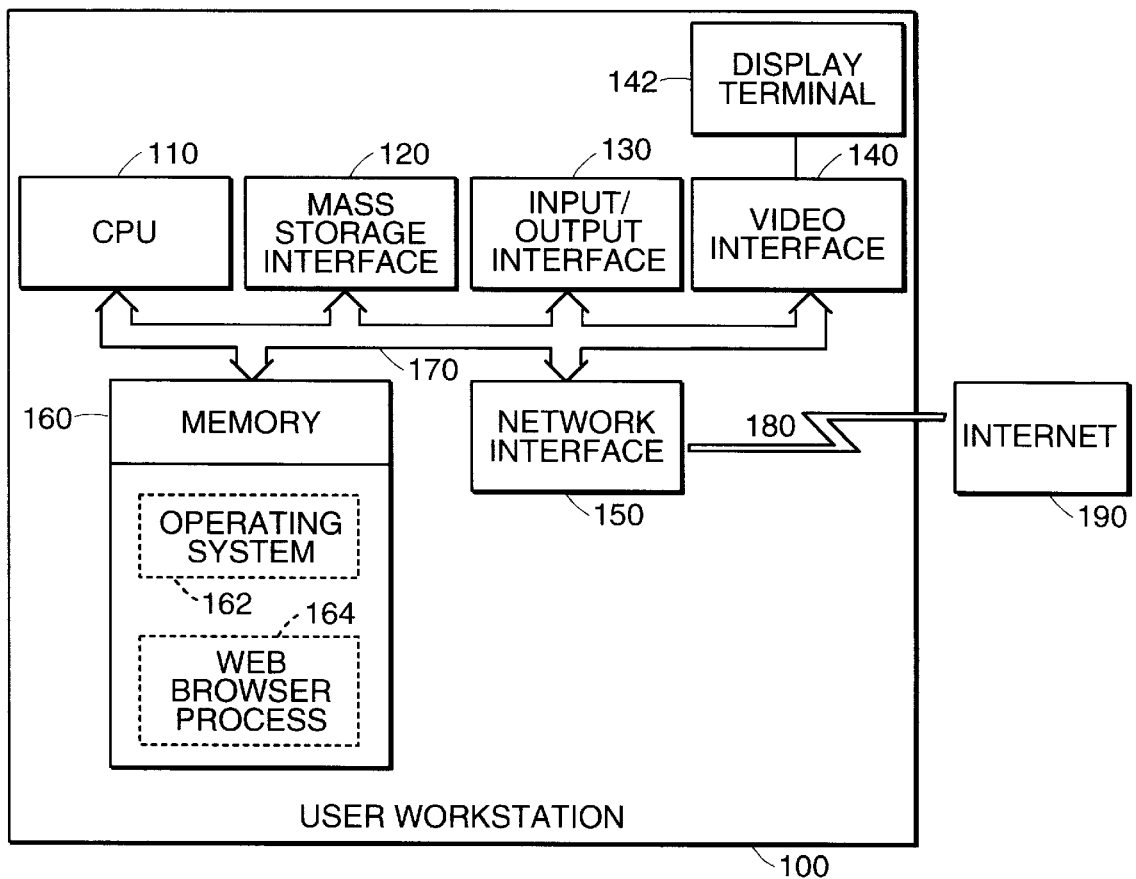
FIG. 1 is a block diagram of a user workstation that is connected to the Internet and is operating as a web browser.

Referring to FIG. 1, a user workstation 100 is shown as a computer system including for purposes of example a central processing unit (CPU) 110, a mass storage interface 120, an input/output interface 130, a video interface 140, a network interface 150, and a memory 160, all connected by a system bus 170. The memory 160 includes an operating system 162 and a web browser process 164. CPU 110 accesses the contents (e.g. programs and data) stored in memory 160, and executes the programs stored therein, including the operating system 162 and the web browser 164. The user workstation 100 is connected to the Internet 190 by a communicaton link 180, such as a modem, fiber optic network, Ethernet network, wireless network (for example using cellular radio transceivers), etc. User workstation 100 can encompass any type of traditional computer system (such as a personal computer or midrange computer) as well as other types of computer systems, such as, personal digital assistants (PDA) or Internet appliances which may or may not have mass storage devices and may thus not require the mass storage interface 120. Note that many modifications can be made to this user workstation 100 within the scope of the invention; examples include the addition of a display terminal 142 coupled to a video interface 140, a keyboard and mouse (not shown) coupled to an input/output interface 130, etc.

A user or computer operator that wishes to interact with the Internet 190 does so by causing the CPU 110 to execute the web browser 164. Under the control of the web browser 164, the user workstation 100 sends a request over the Internet 190 to an appropriate web server (with a distinct Internet address) that can service the request.

Figure 2:
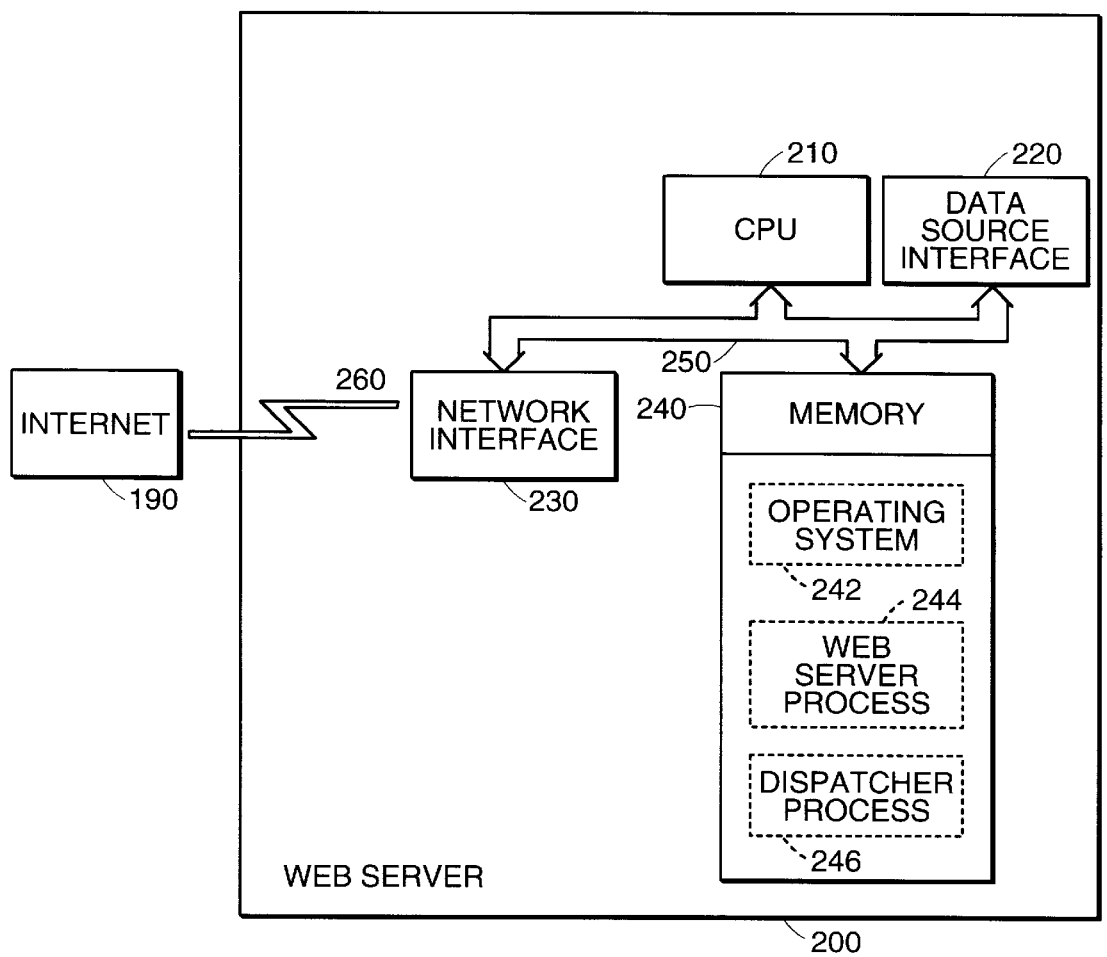
FIG. 2 is a block diagram of a web server computer that is connected to the Internet in accordance with an embodiment of the invention.

Referring to FIG. 2, a web server 200 is a computer system operating as a server in an Internet environment. The web server 200 for example includes a CPU 210, a data source interface 220, a network interface 230, and a memory 240, all connected by a system bus 250. The memory 240 for example includes an operating system 242, a web server process 244, and a number of dispatcher processes 246. CPU 210 accesses the contents (e.g. programs and data) stored in memory 240, and executes the programs stored therein, including the operating system 242, the web server 244, and the dispatchers 246. The web server 200 is connected to the Internet 190 by communication link 260, such as a modem, fiber optic network, Ethernet network, wireless network (for example using cellular radio transceivers), etc.

Web server 200 can encompass any type of computer system, such as a personal computer or midrange computer. Note that many modifications can be made to the web server 200 within the scope of the invention; examples include the addition of a display terminal 142 coupled to a video interface 140, a keyboard and mouse (not shown) coupled to an input/output interface 130, etc.

When a request sent by the web browser 164 of FIG. 1 is transmitted over the Internet 190, the intended web server process 244 to which it was addressed typically receives and services the request. When a request requires the processing of a transaction, the web server process 244 transfers control and passes the request message to a dispatcher process 246. The web server process 244 can interact with the dispatcher process 246, for example, through a Common Gateway Interface (CGI) which is a conventional web server interface that allows a web server process 244 to invoke other programs to help with the processing of transaction requests. In alternative embodiments, other mechanisms are used to invoke the dispatcher process 246 rather than one requiring a CGI, such as a mechanism using a shared library (not shown) that is always loaded in the memory 240 of the web server 200. The dispatcher process 246 processes the transaction request and returns the result to the web server process 244 for transmission back to the web browser process 164 (FIG. 1) of the user workstation 100 that initiated the request.

The data source interface 220 allows the web server 200 to retrieve and store data from one or more mass storage devices such as magnetic disks (e.g. hard drives, tapes, diskettes) (not shown), optical disks (e.g. CD-ROM) (not shown), and other computer readable media (not shown). These mass storage devices are commonly known as Direct Access Storage Devices (DASD), and act as a permanent store of information. The information from the DASD can be in many forms. Common forms are application programs and program data. Data retrieved through the data source interface is usually placed in memory 240 where CPU 210 can process it.

While memory 240 and DASD devices (not shown) are typically separate storage devices, the web server 200 for example uses virtual addressing mechanisms that allow the programs of web server 200 to behave as if they only have access to a large, single storage entity, instead of access to multiple, smaller storage entities (i.e. memory 240 and DASD). Therefore, while certain elements are shown to reside in memory 240, they are not necessarily all completely contained in memory 240 at the same time. It should be noted that the term "memory" is used herein to refer to the entire virtual memory of web server 200.

Network interface 230 allows the web server 200 to send and receive data to and from the Internet 190, to which the web server 200 is connected. The network interface 230 can be connected to a local area network (not shown) or a wide area network (not shown) rather than the Internet 190 when sending or receiving messages. Suitable methods of connecting to the Internet 190 are well known to those skilled in the art. Many different network protocols can be used to implement a network. These protocols are specialized computer programs that allow computers to communicate across a network. TCP/IP (Transmission Control Protocol/Internet Protocol), used to communicate across the Internet 190, is an example of a suitable network protocol.

System bus 250 allows data to be transferred among the various components of web server 200. Although web server 200 is shown to contain only a single CPU 210 and a single system bus 250, an alternative embodiment employs a computer system that has multiple CPUs and/or multiple buses. In addition, the components of web server 200 that are used in the preferred embodiment can for example include separate, fully programmed microprocessors that are used to off-load compute-intensive processing from CPU 210, or may include 10 adapters (not shown) to perform similar functions.

The web browser process 164 is operable to connect the user workstation 100 to a server on the Internet 190, such as to a web server of a design, for example, similar to that of web server 200, in order to transmit or receive information. The received information can be subsequently displayed on display terminal 142. Information received by the web browser process 164 over the Internet 190 and displayed on display terminal 142 of user workstation 100 is typically organized into pages that are constructed using a specialized language called Hypertext Markup Language (HTML). Early web pages contained static data, meaning that the data on the page would be the same regardless of who accessed the page or when it was accessed. More recent web pages include dynamic data, which means that data on certain portions of the page is subject to change. When accessing a page that includes dynamic data, the web server 200 must know how and from what data source to retrieve the needed information for dynamic insertion into a given HTML page. Web server 200 preferably allows for dynamic data insertion, by using dispatcher process 246 to process an HTML page and handle function calls or queries (i.e. transactions) contained within a request message transmitted by the web browser process 164.

Figure 3:
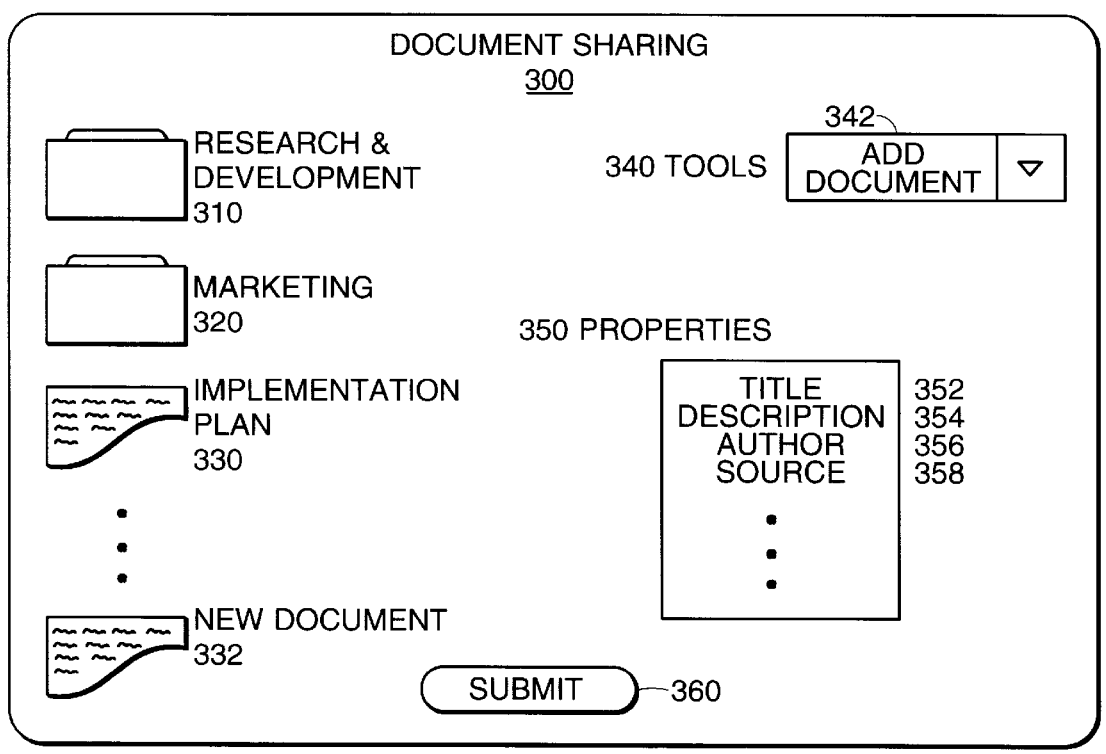
FIG. 3 is a block diagram of an illustrative HTML page displayed by a web browser program, which is used to submit transaction request messages to the dispatcher process of FIG. 2.

Referring now to FIG. 3, the document sharing page 300 is an example of an HTML page that can be displayed to a computer operator at user workstation 100. The document sharing page 300 enables the computer operator to view, add, modify, and otherwise manipulate elements contained within the document sharing page 300. For example, the document sharing page 300 can contain visual representations of a research & development folder 310, a marketing folder 320, and an implementation plan file 330. Properties 350 for the research & development folder 310, marketing folder 320, and implementation plan file 330 can include, for example, a title 352, description 354, author 356, and source 358.

Further the document sharing page 300 contains, for example, a number of tools 340 that can be used to manipulate a file or folder. The ability to add a document to a database (not shown) is provided, for example, by an add document tool 342. After selecting the add document tool 342, the computer operator can click with his mouse on the submit button 360 to transmit the transaction request to the web server 200 where the document is added to the database so that other authorized individuals can view the document over the Internet 190. Once the document has been added to the database, the web server 200 notifies the web browser 164 that the transaction is complete. The web browser 164 can subsequently display a visual representation of the new document 332 in the document sharing page 300.

Referring now to FIGS. 3 and 4, when the computer operator makes the desired selections in the document sharing page 300 and clicks on the submit button 360, the web browser 164 transmits a transaction request message over the Internet 190 via network interface 150 that is then received by web server 200. An illustrative transaction request message 400 can include the following elements or fields: a web server address 410, an access control group 420, a program name 430, a database name 440, a transaction name 450, and a number of transaction arguments 460.

The web server address 410 identifies the particular web server 200 on the Internet 190 for which the transaction request message 400 is intended (sample syntax: www-server.myfirm.com). The access control group 420 identifies the authentication environment from which the user's identity will be authenticated by either the web server process 244 or the dispatcher process 246 (sample syntax: power_user_grp). Further, the access control group 420 allows the invention to process transactions using the same dispatcher process 246, despite having different authentication environments. The program name 430 corresponds to the dispatcher process 246 that must be executed to process the transaction request message 400 (sample syntax: dispatch.cgi). Once the transaction request message 400 has been received by the web server 200, and the user has been authenticated as a valid user by the web server process 244, the web server process 244 transfers control to the dispatcher process 246 to complete processing the transaction. Alternatively, the dispatcher process 246 can perform the authentication of the user.

Dispatcher

The dispatcher process 246 of FIG. 2 parses the transaction request message 400 of FIG. 4 and assigns its elements to transaction variables that are then used to process the transaction request. The database instantiation 440 tells the dispatcher process 246 the name of the database that, for example, must be opened and manipulated when adding a new document (sample syntax: _M_STRAT_docshare). The transaction name 450, provides the dispatcher process 246 with the command/function which forms the substance of the transaction request and which, for example, corresponds to the add document tool 342 selection on the document sharing page 300 (sample syntax: addNewDoc). Further, the transaction arguments 460 provide the dispatcher process 246 with other transaction variables that are necessary for processing the transaction request message 400, for example, the identification number of the folder where the new document will reside (sample syntax: 10014).

Figure 5:
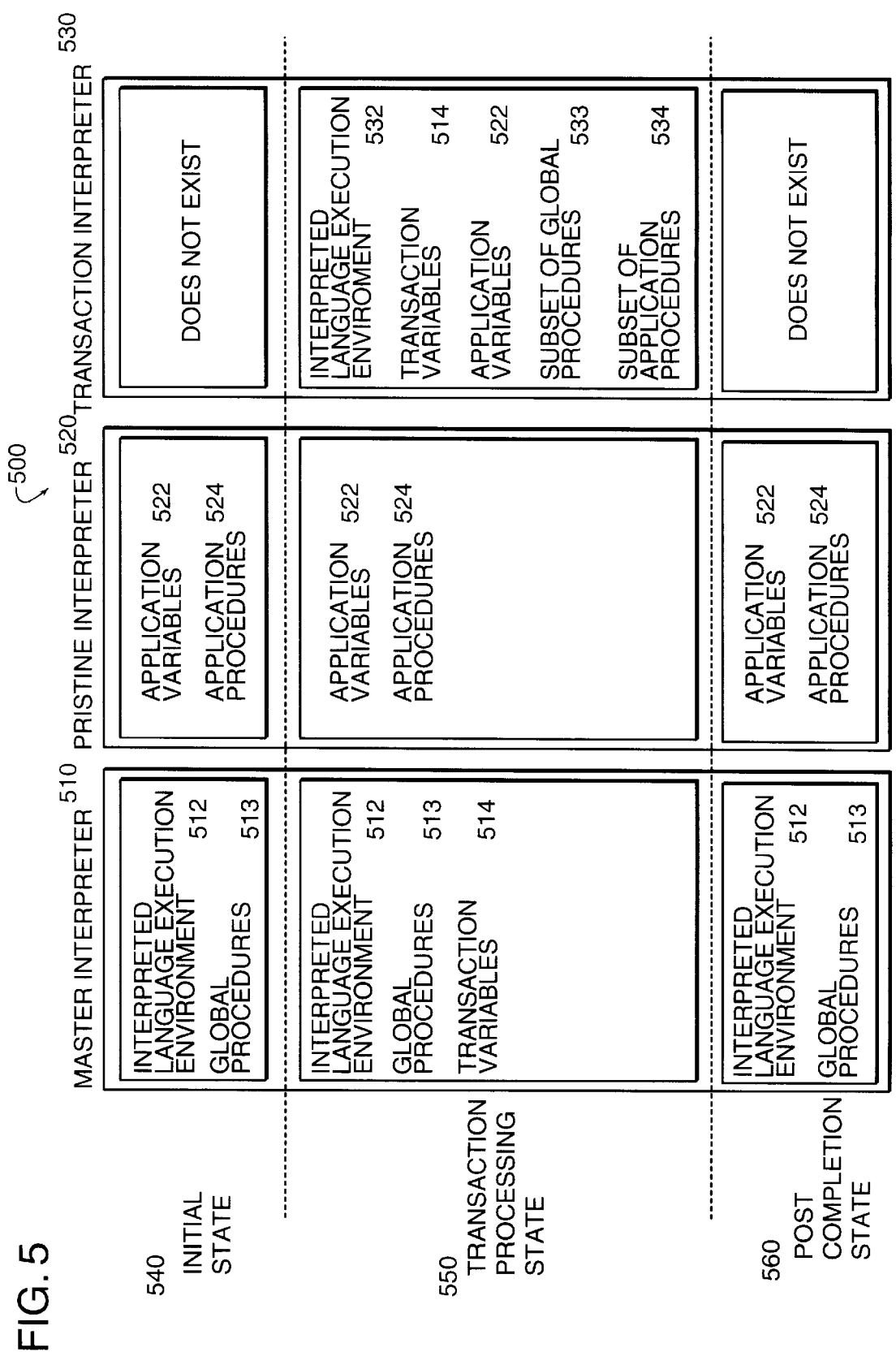
FIG. 5 is a block diagram of the master, pristine, and transaction interpreters of the dispatcher process of FIG. 2, depicting various illustrative states encountered by these interpreters when processing a transaction request message in accordance with the present invention.

Referring now to FIG. 5, the dispatcher process 500 in accordance with this invention includes a master interpreter 510, a pristine interpreter 520, and a transaction interpreter 530. The master interpreter 510, pristine interpreter 520, and transaction interpreter 530 encounter three states: an initial state 540 analogous to an idle condition where the dispatcher 500 is waiting for the transaction request message 400 to arrive, a transaction processing state 550 reflecting the context of an interpreter when processing the transaction request message 400, and a post completion state 560 when the processing for the transaction request message 400 has completed and the dispatcher 500 returns to a wait state in preparation for the next transaction.

Interpreter Operation

An illustrative purpose of the master interpreter 510 is to manage the processing of the transaction request message 400. The master interpreter 510 can be referred to as a persistent interpreter in that it continues to exist in memory 240 after the transaction request message 400 has been processed and is therefore available to service other transaction request messages received later in time. Indeed, the master interpreter 510 can exist in memory 240 indefinitely or for a predetermined number of transaction requests processed or for a predetermined time period extending typically beyond the duration of processing a single transaction request. The duration of the master interpreter 510 can be a programmatically or dynamically alterable value. If the master interpreter 510 fails (which would cause the dispatcher 500 to also fail), for example, due to a problem with the software or with the operating system 242, a guardian process (not shown) maintained in memory 240 could be utilized for example to monitor, form, and rebuild the master interpreter 510 and the dispatcher 500.

When the master interpreter 510 is in the initial state 540, the master interpreter 510 contains the interpreted language execution environment 512 along with a number of global procedures 513 and global variables (not shown). The global procedures 513 include procedures that are useful when processing a variety of transaction types requiring the execution of different application programs. Examples of global procedures 513 include error trapping procedures that capture and respond to certain types of error messages, database functions and commands, etc.

During the transaction processing state 550, the master interpreter 510 adds transaction variables 514 and their values to the context of the master interpreter 510 (in addition to that context already present during the initial state 540). These transaction variables 514 store elements of the transaction request message 400, such as the database instantiation 440, transaction name 450, transaction arguments 460, etc. The transaction variables 514 are specific to the transaction request message 400 and are used when processing the transaction request.

During the post completion state 560, the master interpreter 510 contains only the interpreted language execution environment 512 and the global procedures 513 that were present during the initial state 540 of the master interpreter 510. The transaction variables 514 that were specific to the transaction request message 400 and which were present during the transaction processing state 550 are no longer stored in memory 240 during the post completion state 560 of the master interpreter 510.

Figure 6:
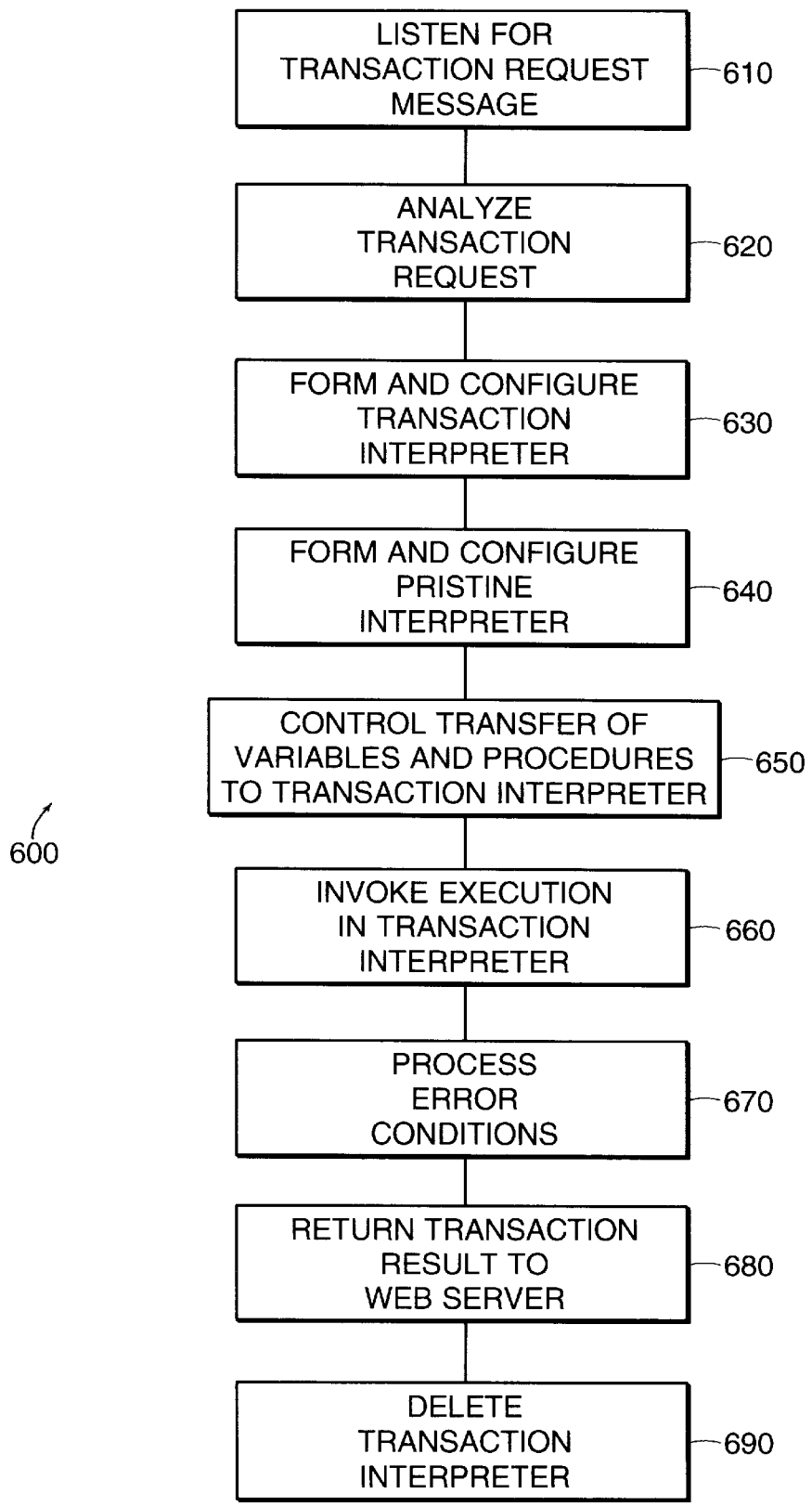
FIG. 6 is a flow diagram illustrating example functions of the master interpreter of FIG. 5 when processing a transaction request in accordance with the present invention.

Referring now to FIGS. 5 and 6, an overview of a method 600 implemented by the master interpreter 510 in accordance with this invention is provided. During the initial state 540, the master interpreter 510 listens for a transaction request message to arrive (step 610).

Once a transaction request is received, the master interpreter 510 enters the transaction processing state 550. The master interpreter 510 analyzes the transaction request (step 620), validates and parses the transaction request message 400, and assigns the various elements of the transaction request message 400 to transaction variables 514. The master interpreter 510 then forms and configures the transaction interpreter 530 (step 630) that will be used to process the transaction request message 400. The master interpreter 510 also forms and configures the pristine interpreter 520 (step 640), if not already present and configured, to obtain application variables 522 and application procedures 524 necessary for processing the transaction request message 400. The master interpreter 5 10 subsequently controls the transfer of transaction variables 514, application variables 522, global procedures 513, and application procedures 524 to the transaction interpreter 530 (step 650). The master interpreter 510 then invokes execution in the transaction interpreter 530 (step 660) to process the transaction request message 400. The master interpreter 510 also processes and responds to any error conditions that occur during execution in the transaction interpreter 530 (step 670).

When processing of the transaction request message 400 is complete, the master interpreter 510 enters the post completion state 560 and returns the transaction result to the web server process 244 for transmission back to the web browser process 164 that had sent the transaction request message 400 (step 680). The master interpreter 510 then deletes the transaction variables 514 stored within the master interpreter 510 itself, along with deleting the transaction interpreter 530 (step 690). Once the master interpreter 510 has completed these post transaction clean-up steps, it re-enters the initial state 540 and begins to listen for any other transaction request messages (step 610).

An illustrative purpose of the pristine interpreter 520 is to store application variables 522 (including their values) and application procedures 524 that are necessary for the processing of the transaction request message 400. The pristine interpreter 520 contains the application variables 522 and application procedures 524 associated with a particular application program—preferably, there is one pristine interpreter 520 for each application program required. The pristine interpreter 520 can also contain, for example, global procedures 513, global variables (not shown), or subsets thereof.

The pristine interpreter 520 can also be referred to as a persistent interpreter in that the pristine interpreter 520 continues to exist in memory 240 after the transaction request message 400 has been processed and is therefore available to service other transaction request messages that require the application program associated with that particular pristine interpreter. As with the master interpreter 510, the duration of the pristine interpreter 520 can be a programmatically fixed or dynamically alterable value. Likewise, a maximum number of pristine interpreters resident in memory 240 at any one time can be programmatically fixed or dynamically determined to ensure that the space occupied by the pristine interpreters in memory 240 does not encumber other processes operating within the memory 240 of web server 200.

Preferably, the pristine interpreters associated with particular application programs will be maintained in memory 240 indefinitely (assuming that the memory 240 is large enough to store these pristine interpreters). The duration of the pristine interpreter 520 can also be based, for example, on the historical frequency that its application program is used, or on the amount of memory 240 available to store the pristine interpreters 520 associated with relatively large and complex application programs, or when the application program associated with a pristine interpreter changes, or upon the occurrence of a combination of these examples. A history based prediction scheme can be a viable method of setting the duration of the pristine interpreter 520. In mission or business critical applications, the pristine interpreter 520 associated with the critical application program can be preloaded and preconfigured in memory 240 (and subsequently maintained indefinitely in memory 240) when the web server 200 is booted so that the pristine interpreter and its associated application program will be available substantially immediately to support any critical transaction requests.

Referring to FIG. 5, if the pristine interpreter 520 for an application program that is required to process the transaction request message 400 already exists and is resident in memory 240, the initial state 540 of the pristine interpreter 520 contains that application program's application variables 522 and application procedures 524. These application variables 522 and application procedures 524 are maintained without modification (i.e. in their original, pristine condition) throughout the transaction processing state 550 and the post completion state 560 until the pristine interpreter 520 is deleted from memory 240. The context of the pristine interpreter 520 does not change even across multiple transaction request messages, thus ensuring that a pristine or unadulterated copy of the application variables 522 and application procedures 524 for a particular application program is maintained for the duration of the pristine interpreter 520.

In the event that the underlying application program is subsequently modified, then the pristine interpreter 520 associated with that application program can be deleted, thus ensuring that every pristine interpreter resident in memory 240 is up-to-date. Identification of any modifications to the underlying application program can be performed by a number of methods that are well known to those skilled in the art; for example, checking that the creation date for the valid pristine interpreter 520 currently resident in memory 240 post-dates the creation date of the application program.

If the pristine interpreter 520 for an application program that is required to process the transaction request message 400 does not reside in memory 240, the initial state 540 of the pristine interpreter 520 does not exist because the pristine interpreter 520 does not exist. This situation must be remedied before entering the transaction processing state 550. As previously discussed, the master interpreter 510 forms the pristine interpreter 520 (FIG. 6, step 640) and then temporarily transfers control to the pristine interpreter 520 until the required application variables 522 and application procedures 524 are available in the pristine interpreter 520.

Figure 7:
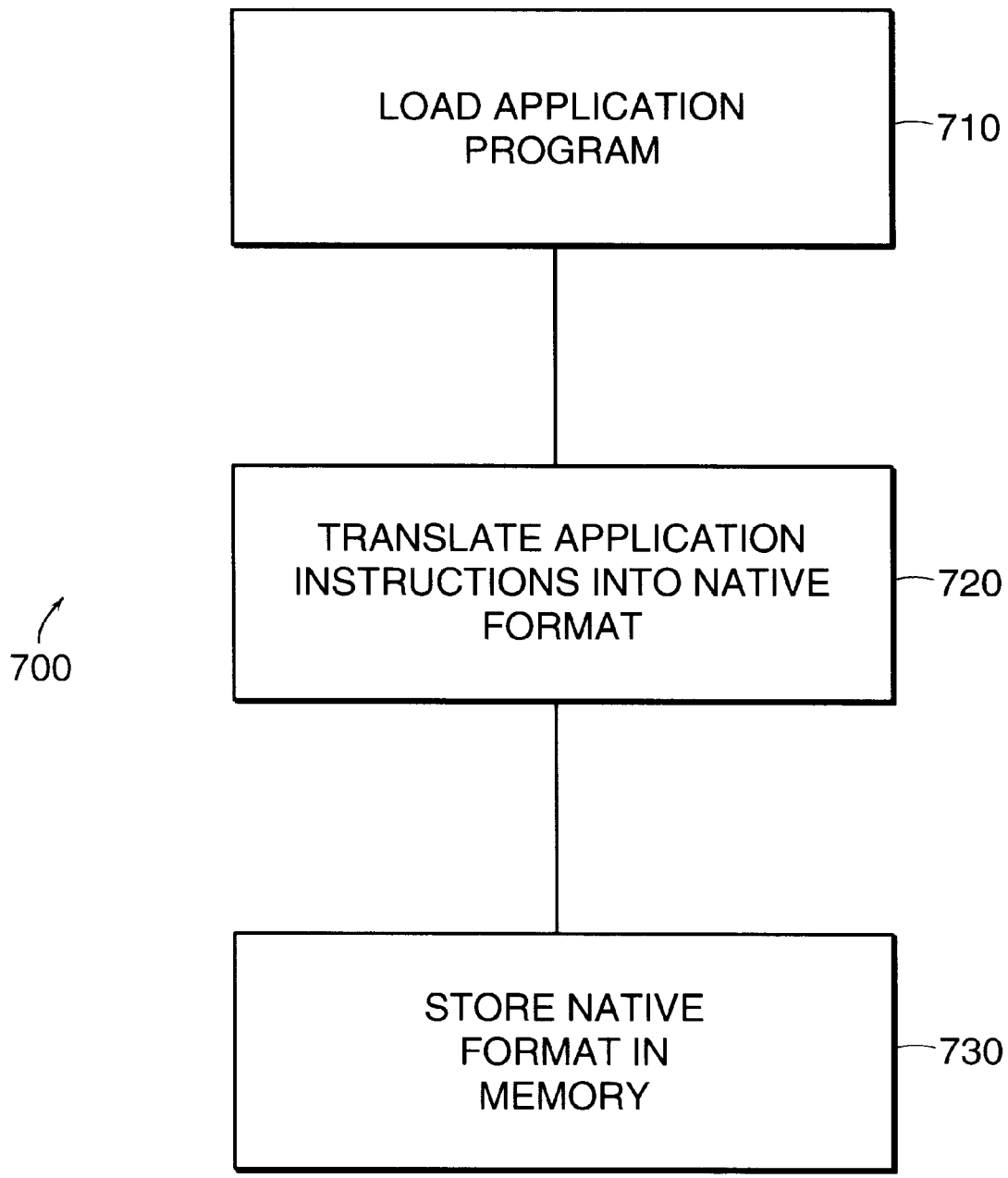
FIG. 7 is a flow diagram illustrating example functions of the pristine interpreter of FIG. 5 when processing a transaction request in accordance with the present invention.

Referring now to FIGS. 5 and 7, the pristine interpreter 520 loads the desired application program from a data source (not shown) into memory 240 (step 710) via the data source interface 220 coupled to the web server 200. The pristine interpreter 520 then translates the instructions of this application program into a format that is native to the interpreted language execution environment 512, such as into application variables 522 and application procedures 524 (step 720). Note that the translation may require, for example, that the pristine interpreter 520 also contain global procedures 513 and global variables (not shown) or subsets thereof. This native format is then stored in that space of memory 240 constituting the pristine interpreter 520 (step 730). Storing an application program in a native format speeds-up transaction processing. Other examples of native format can also include byte code. Once the required application variables 522 and application procedures 524 are stored in the pristine interpreter 520, control is transferred back to the master interpreter 510.

The technique of on-demand loading is conducive to rapid development and prototyping of an application program since an application developer can quickly make modifications to the application program and immediately check out the result without having to first compile the application source code. By comparing the date that the application program was modified with the date that the pristine interpreter 520 was formed, the master interpreter 510 can determine whether the pristine interpreter 520 resident in memory 240 must be deleted and rebuilt to reflect any source code modifications. This on-demand loading technique is also useful when the modified application program is disseminated to end users. As discussed, the master interpreter 510 will determine that an update to the associated pristine interpreter 520 is required and the pristine interpreter 520 will be rebuilt by the master interpreter 510 without requiring intervention from the end user.

An illustrative purpose of the transaction interpreter 530 is to perform the execution that is required to process the transaction request message 400. The transaction interpreter 530 can be referred to as a transient interpreter in that it resides in memory only during the processing of a single transaction request message 400. The transaction interpreter 530 is formed by the master interpreter 510 (FIG. 6, step 630) during the transaction processing state 550; it is subsequently used to execute the transaction 830, and then it is deleted during the post completion state 560 (FIG. 6, step 690). The transaction interpreter 530 is deleted once the transaction processing is complete because the state of the variables contained in the transaction interpreter 530 has changed as a result of executing the transaction and these modified variables are not useful for future transaction request messages. By isolating the execution to the context of the transaction interpreter 530 and then deleting the transaction interpreter 530 when execution is complete, the preferred embodiment ensures that processing of that particular transaction does not affect future transactions.

A further optimization would entail forming a new transaction interpreter, as soon as the current transaction interpreter 530 is deleted from memory 240, in anticipation of the arrival of a future transaction request message. This optimization would take advantage of the time period between transaction request messages to set up the basic context of the transaction interpreter 530.

Figure 8:
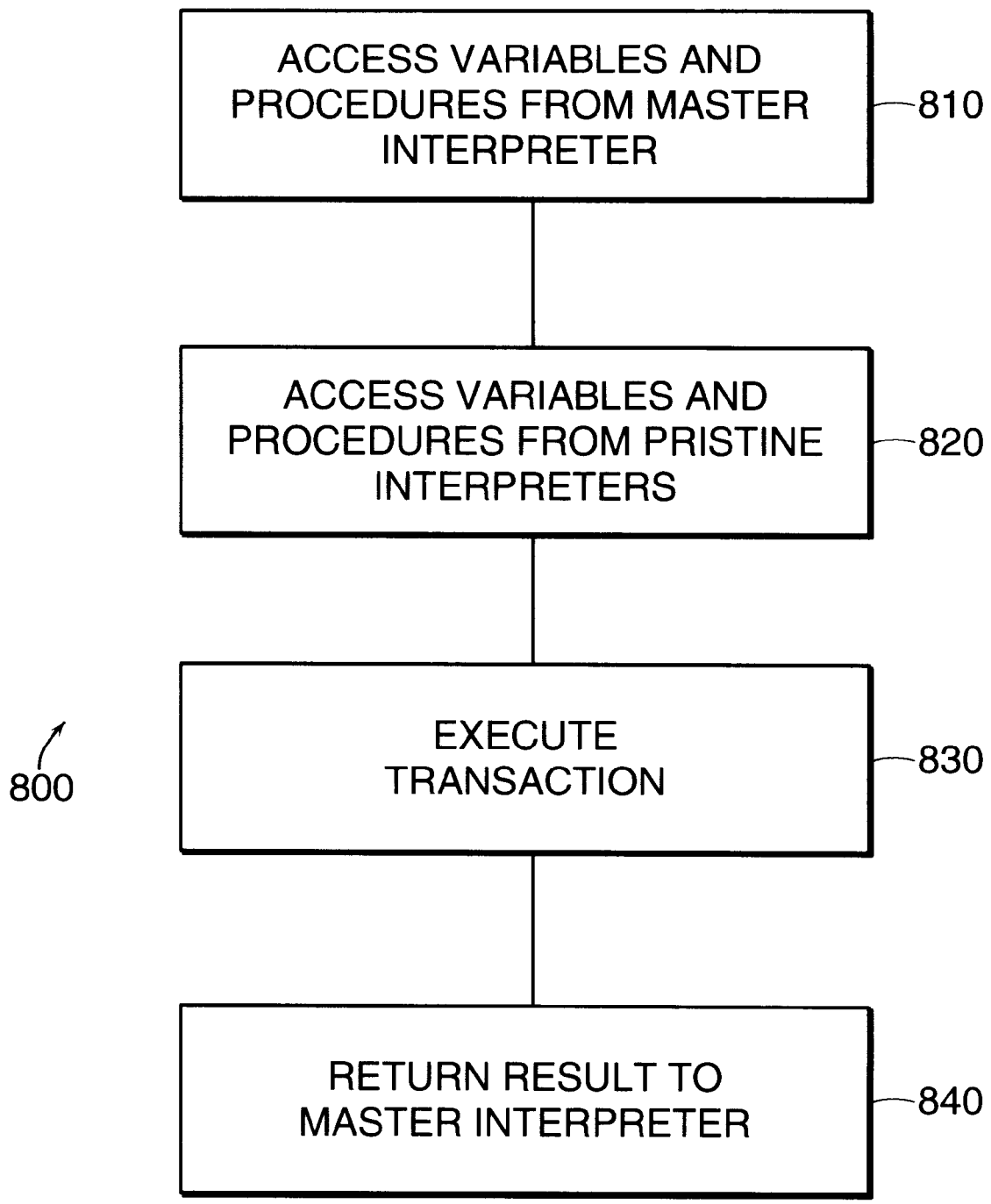
FIG. 8 is a flow diagram illustrating example functions of the transaction interpreter of FIG. 5 when processing a transaction request in accordance with the present invention.

Referring to FIGS. 5 and 8, the basic context of the transaction interpreter 530 includes an interpreted language execution environment 532 that need not be as inclusive as the interpreted language execution environment 512 contained in the master interpreter 510. In addition, the transaction interpreter 530 would also contain global procedures 533 that also need not be as inclusive as those global procedures 513 contained in the master interpreter 510 (i.e. global procedures 533 can be, for example, a subset of global procedures 513).

When executing the transaction during the transaction processing state 550, the transaction interpreter 530 accesses transaction variables 514 and any additional global procedures (not already part of the basic context) that are required for execution from the master interpreter 510 (step 810). The transaction interpreter 530 also accesses application variables 522 and a subset of application procedures 534 from the pristine interpreters 520 (step 820). The transaction interpreter 530 then operates on the context in its execution environment to execute the transaction (step 830) and then returns a result to the master interpreter 510 (step 840). Note that accessing of the aforementioned variables and procedures involves copying these parameters to the transaction interpreter 530. Accessing can also be accomplished by the use of pointers as is well known to those skilled in the art.

It is important to note that the application procedures 534 copied to the transaction interpreter 530 during the transaction processing state 550 is a subset of the application procedures 524 stored in the pristine interpreter 520 for a particular application program. Where the pristine interpreter 520 contains the set of application procedures 524 associated with an application program, the transaction interpreter 530 preferably only accesses that subset of application procedures 534 that is necessary to process the transaction request message 400. This subset of application procedures 534 is determined when processing the transaction request message 400 as discussed in the next section (Method of Processing Transactions). This technique, of copying only what is needed for execution, cuts down on the preparation and setup time prior to execution and this advantage becomes more pronounced as the application programs increase in size and complexity.

During the execution of the transaction in the transaction interpreter 530 (step 830), an application procedure 534 can cause another transaction interpreter 530 to be formed. For example, if the transaction request message 400 and the underlying application program intended not only to add a document to the database, but also to add a new entry to the calendar/task list of each member of a project team (perhaps indicating that the document requires their review), a second transaction interpreter 530 can be utilized to make the calendar entries. In this manner, multiple transaction interpreters could be used for a single transaction request message 440.

Method of Processing Transactions

Figure 9A:
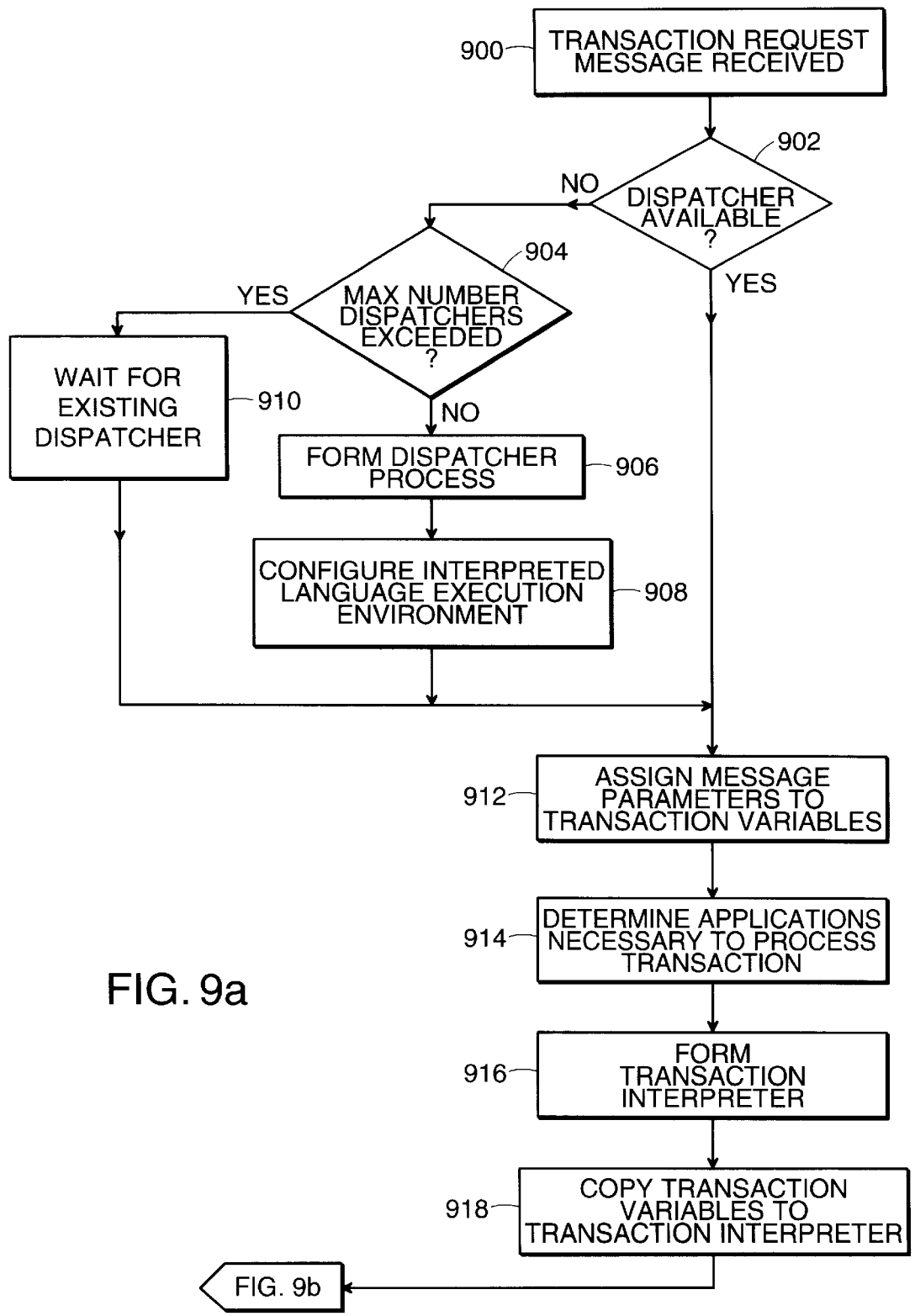
FIGS. 9a–9c contain a flow diagram of an illustrative method used by the master, pristine, and transaction interpreters of FIG. 5 in processing transactions in accordance with an embodiment of the invention.
Figure 9B:
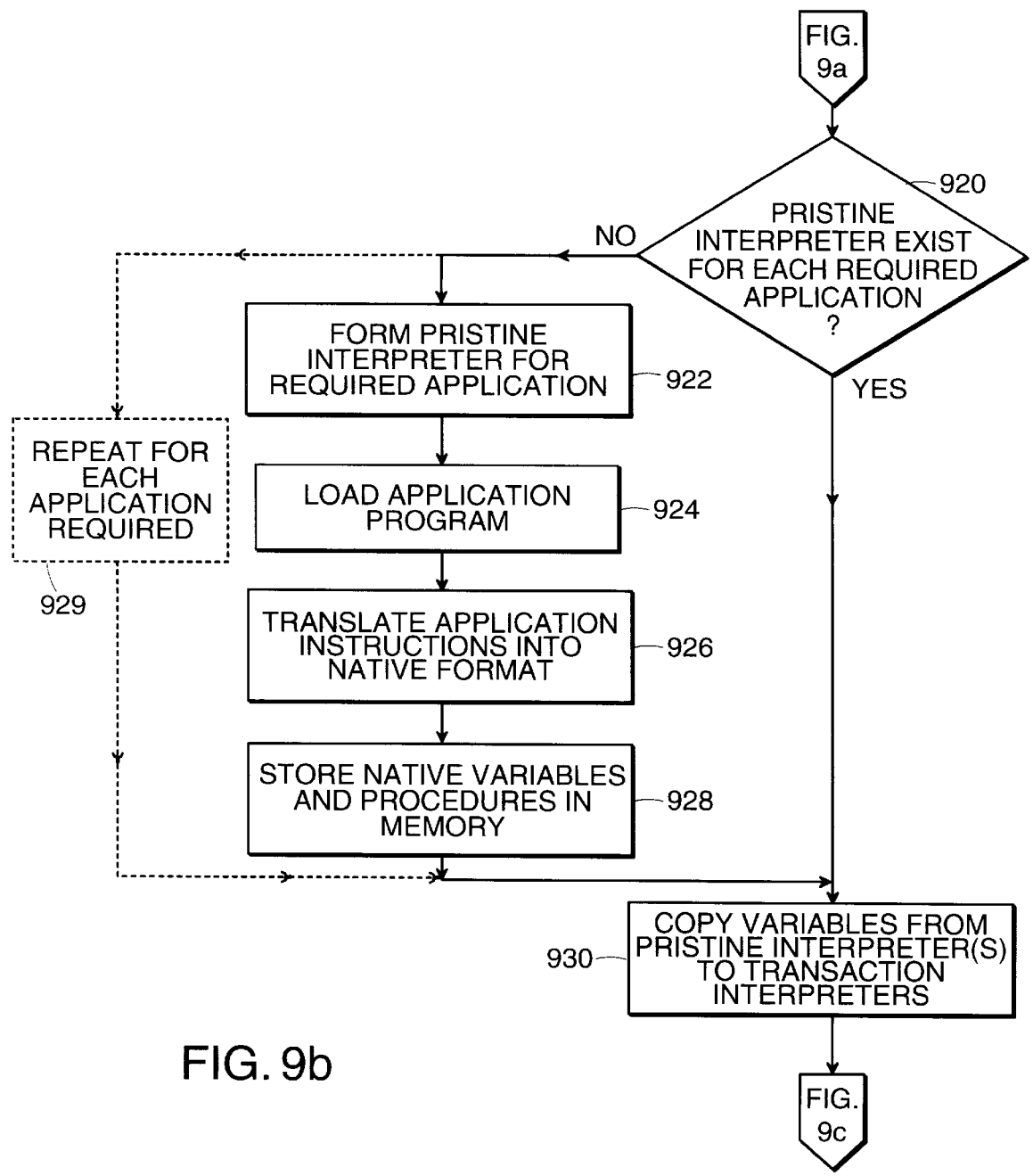
Figure 9C:
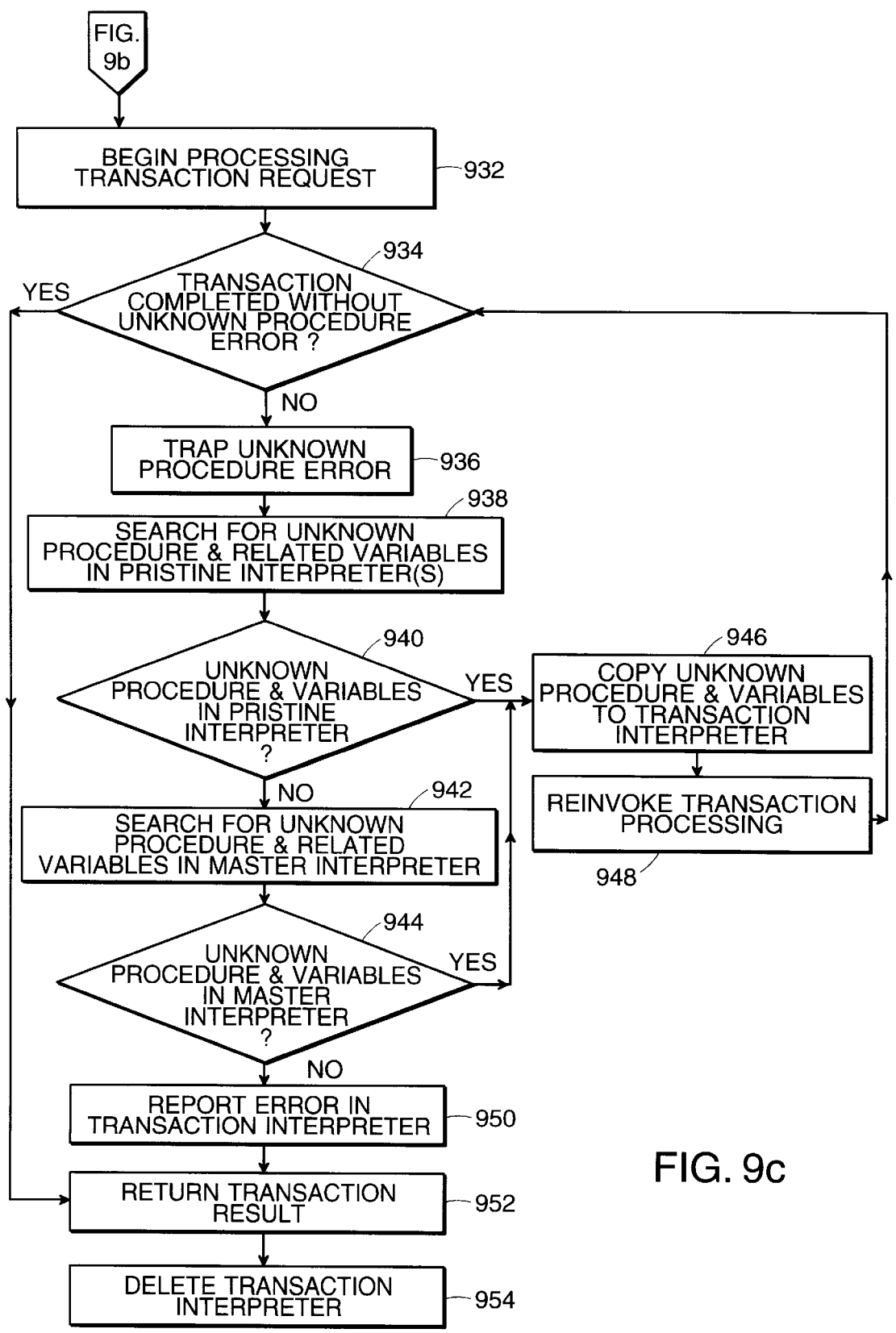

A detailed method of processing transactions in accordance with this invention is shown in FIGS. 9a–c. At FIG. 9a, when the web server process 244 receives the transaction request message 400 (step 900), it determines whether a dispatcher process 246 is available to accept the transaction request message 400 (step 902). Three possibilities are illustrated involving the immediate availability of dispatcher 246, the situation where a maximum number of dispatchers has been exceeded or where the maximum number of dispatchers has not been exceeded and a dispatcher must be formed.

If the computer operator of web server 200 has not placed a maximum limit on the quantity or size of dispatcher processes that can exist at any one time, then the dispatcher process 500 is available and will assign transaction request message 400 parameters as values for transaction variables 514 that are then stored in the master interpreter 510 (step 912). These parameters for example include the database instantiation 440, the transaction name 450, and other transaction arguments 460 that are necessary for processing the transaction request message 400. However, if the computer operator of web server 200 has established limits on the quantity and size of the dispatcher processes that can reside at any one time in memory 240 and the limit has been exceeded, then the transaction request message 400 will have to wait for an existing dispatcher to free-up (step 910). Where the limit has not been exceeded and a dispatcher is not currently available, the web server process 244 can form a new dispatcher process (step 906) and configure the master interpreter 510 of that dispatcher 500 with an interpreted language execution environment 512 (step 908).

With the dispatcher 500 available and the transaction request message 400 parameters stored in transaction variables 514 (step 912), the master interpreter 510 examines the transaction variables 514 to determine which application programs are required to process the transaction (step 914). The master interpreter 510 then forms a transaction interpreter 530 that will eventually be used to execute the transaction and which now contains the interpreted language execution environment 532 and global procedures 533 (step 916). At this point, the transaction variables 514 can be copied by the master interpreter 510 to the transaction interpreter 530 (step 918); however this copying step could also occur later, such as after step 930.

Moving on to FIG. 9b, where the master interpreter 510 has determined the application program that is required to process the transaction request by examining the contents of the transaction variables 514 (step 914), the master interpreter 510 now determines whether the pristine interpreter 520, associated with the required application program, exists (step 920). The pristine interpreter 520 for that application program would already reside in memory 240 if the pristine interpreter 520 had been pre-loaded during boot-up of the web server 200 or if a prior transaction request message had invoked the pristine interpreter 520 (assuming that it was not subsequently deleted).

If the pristine interpreter 520 for the required application program does not exist, then the master interpreter 510 forms the pristine interpreter 520 (step 922). The master interpreter 510 then copies the application program from the data source (not shown) where it is stored to memory 240 (step 924).

When forming the pristine interpreter 520, the master interpreter 510 establishes a sufficient interpreted language execution environment within the pristine interpreter 520 to enable the pristine interpreter 520 to translate the application instructions into a format that is native to the interpreted language (step 926). Note that this sufficient interpreted language execution environment established in the pristine interpreter 520 can include, for example, the global procedures 513 and global variables (not shown) that are maintained in master interpreter 510. These natively formatted parameters, such as application variables 522, application procedures 524 (byte code, etc.), are then stored in the pristine interpreter 520 (step 928). The interpreted language execution environment that was used to perform the required translation is then deleted from memory 240 and the pristine interpreter 520 stores only the end result of the translation (i.e. natively formatted parameters, in this case application variables 522 and application procedures 524). Note that steps 924–928 are identical to steps 710–730 in FIG. 7.

Steps 922 through 928, involving forming and configuring the pristine interpreter 520, are for example repeated for each application program required (step 929) so as to ensure that all of the necessary pristine interpreters are available for processing the transaction request message 400. Generally, steps 922–928 are used to store natively formatted, application-related parameters in memory 240, so that they can be accessed in support of the execution of the transaction. Once the pristine interpreter 520 is available, the master interpreter 510 copies the application variables 522 from the pristine interpreter 520 to the transaction interpreter 530 (step 930).

Moving on to FIG. 9c, steps 932–950 provide the illustrative details associated with step 830 (FIG. 8) involving executing the transaction requested by the transaction request message 400. The master interpreter 510 invokes the transaction interpreter 530 to begin processing the transaction request (step 932). If the transaction is successfully executed without encountering unknown procedure errors (step 934), then the master interpreter returns the transaction result to the web server 200 (step 952) for transmission back to the web browser process 164 that had submitted the transaction request message 400.

However, successful execution on this first pass through the transaction interpreter 530 may not occur, since the context of the transaction interpreter 530 at this stage does not yet include the application procedures 534 that are required for processing the transaction request. At this point the transaction interpreter 530 has not been fully configured and contains an interpreted language execution environment 532, a subset of global procedures 533, transaction variables 514, and application variables 522. The lack of relevant application procedures 534 in the transaction interpreter 530 at this stage may result in an unknown procedure error (step 934).

The unknown procedure error is captured or trapped so that it is not reported as a failure and thus terminate the execution (step 936). Implementation details of this error trap mechanism are well known to those skilled in the art and can be implemented, for example, by the "unknown" command in TCL.

The transaction interpreter 530 provides the master interpreter 510 with the name of the unknown procedure along with its related variables. The master interpreter 510 then searches each pristine interpreter 520 for the unknown procedure and related variables (Step 938). If the unknown procedure is located in pristine interpreter 520 (step 940), then the master interpreter 510 copies the unknown procedure and its related variables to the transaction interpreter 530 (step 946). The master interpreter 510 re-invokes the transaction interpreter 530 to continue execution where it left off (step 948). If execution completes without any further unknown procedure errors (step 934), then the invention proceeds to step 952 and returns the transaction result to the web server 200 (step 952). If further unknown procedure errors are encountered, then the above method is repeated.

In the event that the unknown procedure is not located in the pristine interpreter 520 (step 940), the master interpreter 510 searches for the unknown procedure in the master interpreter 510 itself (step 942). If the unknown procedure is located in the master interpreter 510 (step 944), the master interpreter copies the unknown procedure and related variables to the transaction interpreter 530 ( Step 946 ) and re-invokes the transaction interpreter 530 to continue execution where it left off (step 948). Alternatively, the transaction interpreter 530, rather than the master interpreter 510, can perform steps 938–948 involving the searching and copying of the unknown procedure and related variables from the master interpreter 510 and pristine interpreter 520 to the transaction interpreter 530. If the unknown procedure and related variables are not located in either the pristine interpreter 530 or the master interpreter 510 (steps 940, 944), then the transaction interpreter 530 does not capture the error and it is reported to the master interpreter 510 as an execution error (step 950) which terminates execution.

At the completion of execution, the master interpreter 510 returns the transaction result to the web server 200 (step 952). The master interpreter 510 then performs a clean-up process where it deletes the transaction interpreter 530 along with all of its contents as well as deleting the transaction variables 514 in the master interpreter 510 itself (step 954).

The looping technique described above allows this embodiment of the invention to dynamically load only those subsets of application procedures 534 that are necessary to execute the transaction. This eliminates the need to copy the entire set of application procedures 524 for a particular application program into the transaction interpreter 530, where many of these procedures are not utilized in processing the particular transaction request received. The overall processing time is therefore improved, particularly where the required procedures are few and are contained within large/complex application programs.

Figure 10:
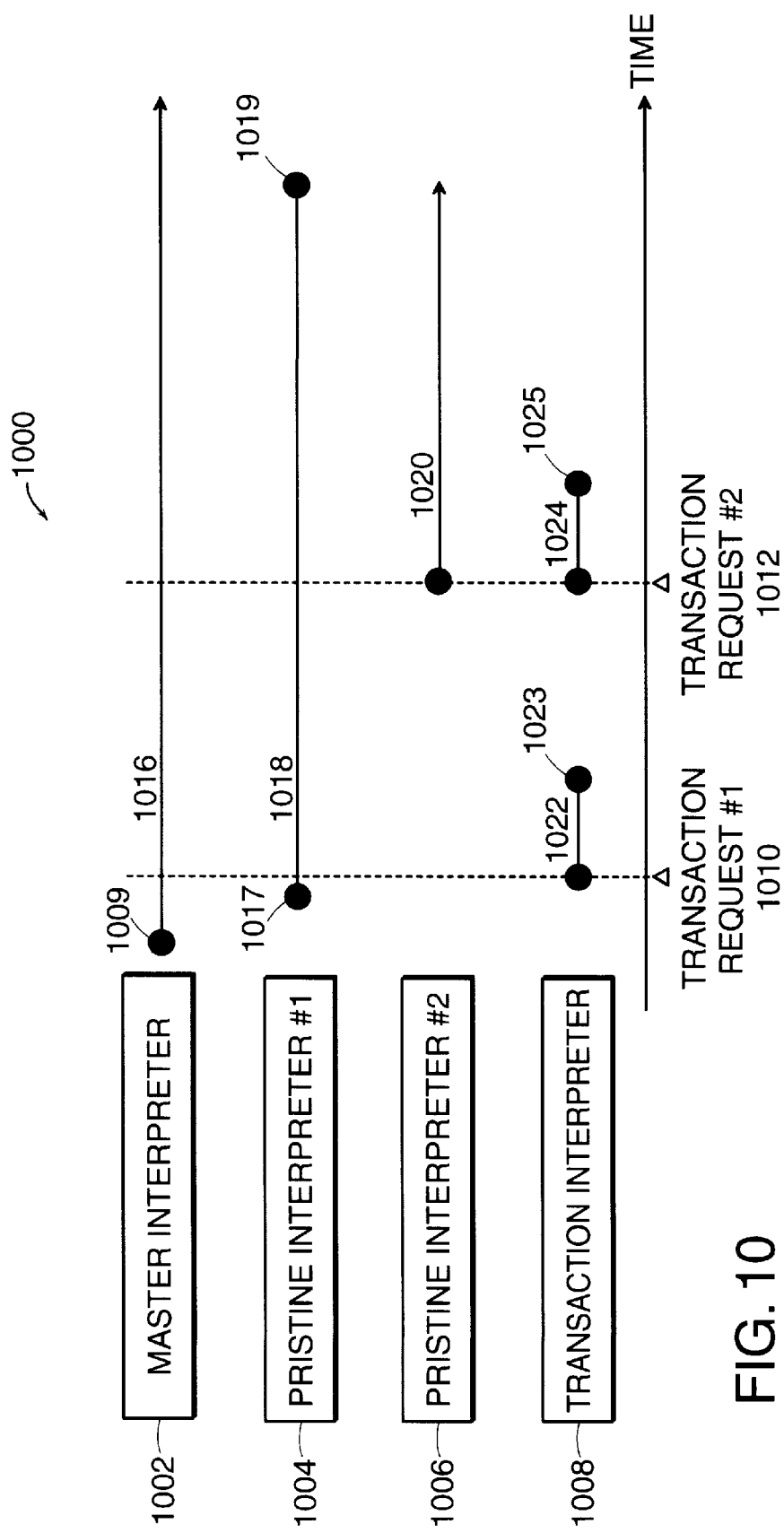
FIG. 10 is a timing diagram showing illustrative time durations for the master, pristine, and transaction interpreters as subsequent transaction request messages are received in accordance with the present invention.

Referring now to FIG. 10, the sample, timing diagram 1000 further illustrates the persistent and transient nature of each interpreter type that can occur in accordance with this embodiment. FIG. 10 provides examples of time duration for each interpreter and is provided to highlight the variety of situations that can appear; it is therefore not all-inclusive. For example, the master interpreter 1002 is formed at time 1009 corresponding to a time prior to the receipt of the first transaction request message 1010 (such as at boot-up time of the web server 200). The duration 1016 of the master interpreter 1002 extends from the time it was formed 1009 to an indefinite time in the future. In this manner, the persistent nature of the master interpreter 1002 allows it to service multiple transaction requests.

A pristine interpreter 1004 can also be preloaded at time 1017 before the time 1010 where the first transaction request is received. This pre-loading technique is particularly useful with frequently used application programs or with mission critical or time sensitive operations. By pre-loading the pristine interpreter 1004, the pristine interpreter 1004 will be available to support the processing of a transaction request substantially immediately since the setup time for the pristine interpreter 1004 would have been incurred earlier at time 1017. Therefore steps 922–928 (FIG. 9) would have occurred beginning at time 1017 and would be complete before the time 1010 that the transaction request is received.

Pristine interpreter 1004 has a time duration 1018 that can extend from the time it was formed 1017 to some indeterminate time in the future (as previously discussed, the preferred embodiment is to extend the time duration 1018 indefinitely). The pristine interpreter 1004 can also be deleted at any time 1019 specified by the computer operator of web server 200 or time 1019 can be dynamically or programmatically determined. Time 1019 can, for example, be based on the historical frequency of use of the pristine interpreter 1004, or on the amount of memory 240 that is available to the dispatcher process 500, or upon a modification to the application program associated with pristine interpreter 1004, or upon a combination of these examples.

Multiple pristine interpreters will likely reside in memory 240 at any one time. For example, a second pristine interpreter 1006 can be dynamically formed in response to a second transaction request message received at time 1012. As with the first pristine interpreter 1004, the second pristine interpreter 1006 can reside in memory 240 for an indefinite or alterable period of time 1020.

The transaction interpreter 1008 is formed in response to the first transaction request received at time 1010 and extends for a duration 1022 until the execution of the transaction is complete and it is subsequently deleted at time 1023 by the master interpreter 1002. During the transaction interpreter's 1008 transaction processing state 550 (FIG. 5), the transaction interpreter 1008 is controlled by master interpreter 1002 and is supported by the application variables 522 and application procedures 534 stored in pristine interpreter 1004.

Similarly, transaction interpreter 1008 can be formed in response to a second transaction request message received at time 1012 and can extend for a duration 1024 before it is deleted at time 1025 when the transaction execution is complete. The transaction interpreter 1008 formed in response to this second transaction request depends on the parameters contained within the pristine interpreter 1006 that was dynamically formed and configured (steps 922–928) also in response to this second transaction request message. The transaction interpreter 1008 responding to the second transaction request can also access the parameters (e.g. application variables 522 and application procedures 534) that are stored in the first pristine interpreter 1004, since that pristine interpreter 1004 already resides in memory.

Alternative Embodiments

While the invention has been particularly shown and described with reference to preferred exemplary embodiments thereof, it will be understood by those skilled in the art that various changes in form and details may be made therein without departing from the spirit and scope of the invention.

For example, the invention can be used within any computer system that performs transaction processing and is not limited to Internet 190 or web server 200 environments. For example, a client-server architecture on a local area network (LAN) or on an Intranet can use the invention to efficiently process transactions that are submitted by the clients. The invention can also be used to process transactions that are generated by one process (or multiple processes) within the same machine and which can require multiple application programs to execute.

The preferred embodiment operates in a real-time mode environment, however the invention can also be used in other modes, such as in batch mode. In this case, the transactions will be accumulated (i.e. batched) and run at a later time. The invention can be used to process these batched transactions and can be tuned to either pre-load/pre-configure the required pristine interpreters or it can dynamically load them as required.

It is important to note that while the invention has been described in the context of a computer system, those skilled in the art will appreciate that the present invention can be embodied as a computer program product stored on computer readable media which can for example be readily accessed and distributed. The scope of the invention is intended to include any type of computer readable media or method of transfer used to actually carry out the distribution. Examples of computer readable media include: recordable type media such as floppy disks, hard drives, tapes, and CD-ROMs, and transmission type media such as digital, analog, and wireless communication links. As a computer program product, the invention contains computer executable code comprising code portions that are used, for example, to establish and configure the master interpreter, pristine interpreter, and transaction interpreter as previously described.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A method for processing a transaction in an interpreted language execution environment, comprising the steps of:
    A) loading a persistent interpreter into a memory and initiating said persistent interpreter to configure an interpreted language execution environment, said persistent interpreter maintaining a set of variables and procedures, wherein said persistent interpreter is maintained in said memory for a time period, T1; and
    B) loading a transient interpreter into said memory and initiating said transient interpreter, said transient interpreter being operative to access said variables and said procedures maintained by said persistent interpreter, to execute said transaction, and to return a result, wherein said transient interpreter is maintained in said memory for a time period, T2, and wherein T2 is less than T1.

2. The method in accordance with claim 1, wherein said transaction is specified by a message sent by a web browser process and wherein said message is received by a web server process.

3. The method in accordance with claim 1, wherein said time period T1 for maintaining said persistent interpreter in said memory extends for the processing of a plurality of transactions and where said time period T2 for maintaining said transient interpreter in said memory extends for the processing of a single transaction.

4. A method implemented by a computer system, said computer system including at least one central processing unit, a memory coupled to said central processing unit, a number of data sources coupled to said central processing unit and said memory, a network interface apparatus coupling said computer system to a number of other computer systems over a network medium, wherein said computer system receives a number of transaction requests from said other computer systems over said network medium and wherein said computer system executes a program incorporating said method to respond to each of said transaction requests, said method comprising the steps:
    i) accessing a master interpreter wherein said master interpreter configures an interpreted language execution environment and maintains a number of procedures in said memory for a time period T1;
    ii) said master interpreter determining a number of application specific parameters required to process said transaction request by searching for a pristine interpreter having said application specific parameters, wherein said application specific parameters of said pristine interpreter are stored in said memory for a time period T2;
    iii) if said master interpreter is unable to locate said application specific parameters in a pristine interpreter, said master interpreter forming a new pristine interpreter, locating said application specific parameters in said data sources coupled to said computer system, and loading said application specific parameters in said new pristine interpreter;
    iv) if said master interpreter is able to locate said application specific parameters in a pristine interpreter, said master interpreter forming a transaction interpreter that is operative to access said application specific parameters in said pristine interpreter and accessing procedures in said master interpreter, wherein each of said procedures and said application specific parameters accessed from said master interpreter and said pristine interpreter by said transaction interpreter are maintained in a temporary location in said memory for a time period T3;
    v) said transaction interpreter being operative to use said procedures and said application specific parameters maintained in said temporary location of said memory while executing said transaction request, and upon completing execution of said transaction request, said master interpreter deleting said transaction interpreter and said procedures and said application specific parameters stored in said temporary location in said memory; and
    vi) if while executing said transaction request, said transaction interpreter requires access to application specific parameters not stored in said temporary location in said memory, said transaction interpreter searching said master interpreter and said pristine interpreter for said application specific parameters and upon locating said application specific parameters loading said application specific parameters into said temporary location in said memory, and continuing with step (v).

5. The method in accordance with claim 4, wherein said time period T1 is not less than said time period T2 and said time period T3.

6. The method in accordance with claim 4, wherein said time period T2 is greater than said time period T3.

7. The method in accordance with claim 4, further comprising the step of transmitting a number of results to said other computer systems over said network medium.

8. The method in accordance with claim 4, wherein said time period, T1, extends for the processing of a plurality of transactions.

9. The method in accordance with claim 4, wherein said time period, T2, extends for the processing of a plurality of transactions.

10. The method in accordance with claim 4, wherein said time period, T3, extends for the processing of a single transaction.

11. The method in accordance with claim 4, wherein upon completing execution of said transaction, said transaction interpreter sending an indication of said completion to said computer system.

12. The method in accordance with claim 4, wherein upon completing execution of said transaction, said transaction interpreter sending a resulting output of said transaction to said computer system.

13. The method in accordance with claim 4, wherein a maximum number of said pristine interpreters, maintained in said memory and formed by said master interpreter, corresponds to a pre-determined fixed value.

14. The method in accordance with claim 4, wherein a maximum number of said pristine interpreters, maintained in said memory and formed by said master interpreter, corresponds to a dynamically determined value.

15. The method in accordance with claim 4, wherein access to application parameters not stored in said temporary location in said memory, as described in step (vi), is unsuccessful, said transaction interpreter issuing an indication of an error condition to said computer system.

16. A system for processing a plurality of transactions in a web server, comprising:
   A) a master interpreter that maintains a set of global procedures in a memory for said plurality of transactions and that determines a set of application specific parameters required to process a transaction received by said web server;
   B) a pristine interpreter communicatively coupled to said master interpreter, wherein said pristine interpreter corresponds to said set of application specific parameters, and wherein said pristine interpreter maintains said application specific parameters in said memory for said plurality of transactions; and
   C) a transaction interpreter communicatively coupled to said master interpreter, wherein said transaction interpreter accesses a subset of said global procedures maintained by said master interpreter and accesses a subset of said application specific parameters maintained by said pristine interpreters, and wherein said transaction interpreter is maintained in said memory for the processing of a single transaction.

17. The system in accordance with claim 16, wherein said web server includes a computer system communicatively coupled to a local area network.

18. The system in accordance with claim 16, wherein said web server includes a computer system communicative coupled to an Intranet.

19. The system in accordance with claim 16, wherein said master interpreter, said pristine interpreter, and said transaction interpreter operate in a real-time mode environment.

20. The system in accordance with claim 16, wherein said master interpreter, said pristine interpreter, and said transaction interpreter operate in a batch mode.

21. The system in accordance with claim 16, wherein: said transaction interpreter
   A) stores said subset of global procedures and said subset of application specific parameters in said memory,
   B) executes said transaction using said subset of stored global procedures and said subset of stored application specific parameters, and
   C) returns a number of results from executing said transaction to said web server; and
   upon completion of said transaction and return of said results, said master interpreter deletes said subset of global procedures and said subset of application specific parameters stored by said transaction interpreter in said memory.

22. The system in accordance with claim 16, wherein said web server includes a computer apparatus comprising:
   A) at least one central processing unit;
   B) a memory coupled to said central processing unit;
   C) a number of data sources coupled to said central processing unit and said memory; and
   D) a network interface apparatus providing coupling between said web server and a plural off web clients over a network medium.

23. The system in accordance with claim 16, wherein said master interpreter unsuccessfully searches each of said pristine interpreters to locate said application specific parameters required for said transaction and wherein said master interpreter
   A) locates said application specific parameters from a data source communicatively coupled to said web server,
   B) forms a new pristine interpreter,
   C) stores said application specific parameters in said new pristine interpreter,
   D) copies said subset of application specific parameters to said transaction interpreter, and
   E) invokes execution of said transaction by said transaction interpreter.

24. The system in accordance with claim 23, wherein a maximum number of said pristine interpreters, maintained in said memory and formed by said master interpreter, corresponds to a dynamically determined value.

25. A system for processing a transaction in an interpreted language execution environment, comprising a master interpreter, responsive to a transaction request message received by a computer system, and wherein
   A) said master interpreter determines that an application program comprising a number of application variables and application procedures is needed to process said transaction, said master interpreter searches for a pristine interpreter including said application program, and if said pristine interpreter does not exist, said master interpreter forms a new pristine interpreter, and said master interpreter copies said application program from a data source, communicatively coupled with said master interpreter, to said new pristine interpreter; and
   B) said master interpreter forms a transaction interpreter to execute said transaction, wherein said master interpreter copies a number of said application variables and a number of said application procedures required to process said transaction to said transaction interpreter; and
   C) wherein said transaction interpreter operates on said application variables and said application procedures, and upon executing said transaction to completion, said master interpreter deletes said transaction interpreter.

26. The system in accordance with claim 25, wherein said master interpreter, said pristine interpreter, said transaction interpreter, and said transaction request message are formed in said computer system.

27. A computer program product having computer executable code stored on a computer readable medium, said computer program product comprising:
   (A) a first code portion for establishing a master interpreter that maintains a set of global procedures in a memory during the processing of a plurality of transactions and that determines a set of application specific parameters required to process a transaction received by a web server;
   (B) a second code portion for establishing a pristine interpreter communicative coupled with said master interpreter, wherein said pristine interpreter corresponds to said set of application specific parameters, and wherein said pristine interpreter maintains said application specific parameters in said memory during the processing of said plurality of transactions; and C) a third code portion for establishing a transaction interpreter communicatively coupled with said master interpreter, wherein said transaction interpreter accesses a subset of said global procedures maintained by said master interpreter and accesses a subset of said application specific parameters maintained by said pristine interpreters, and wherein said transaction interpreter is maintained in said memory during the processing of a single transaction.

28. A computer program product having computer executable code accessible over a communication link for storage on a computer readable medium, said computer program product comprising:

A) a first code portion for establishing a master interpreter that maintains a set of global procedures in a memory during the processing of a plurality of transactions and determines a set of application specific parameters required to process a transaction received by a web server;

B) a second code portion for establishing a pristine interpreter communicate coupled with said master interpreter, wherein said pristine interpreter corresponds to said set of application specific parameters, and wherein said pristine interpreter maintains said application specific parameters in said memory during the processing of said plurality of transactions; and C) a third code portion for establishing a transaction interpreter communicatively coupled with said master interpreter, wherein said transaction interpreter accesses a subset of said global procedures maintained by said master interpreter and accesses a subset of said application specific parameters maintained by said pristine interpreters, and wherein said transaction interpreter is maintained in said memory during the processing of a single transaction.

* * * * *